United States Patent [19]

Mitchell et al.

[11] Patent Number: 5,169,562
[45] Date of Patent: Dec. 8, 1992

[54] EMULSION BREAKING USING CATIONIC QUATERNARY AMMONIUM STARCH/GUMS

[75] Inventors: David B. Mitchell, Arlington Heights; Mark W. Salihar, Palos Park, both of Ill.

[73] Assignee: W. R. Grace & Co.-Conn., New York, N.Y.

[21] Appl. No.: 499,939

[22] Filed: Mar. 27, 1990

[51] Int. Cl.⁵ .................. B01D 17/05; B01D 21/01
[52] U.S. Cl. .................. 252/358; 252/341; 210/708
[58] Field of Search .............. 252/341, 358, 315.3; 210/708; 208/188; 536/45, 46, 52

[56] References Cited

U.S. PATENT DOCUMENTS

| | | | |
|---|---|---|---|
| 3,467,647 | 9/1969 | Benninga | 252/315.3 X |
| 3,585,148 | 6/1971 | Sackis | 252/344 |
| 3,830,735 | 8/1974 | Tsuk | 252/358 X |
| 3,912,715 | 10/1975 | Jarowenko | 536/52 X |
| 3,956,117 | 5/1976 | Bradley et al. | 252/358 X |
| 3,959,463 | 5/1976 | Nersesian et al. | 252/316 X |
| 4,088,600 | 5/1978 | Tutein et al. | 252/358 X |
| 4,105,461 | 8/1978 | Racciato | 252/8.51 X |
| 4,167,488 | 9/1979 | Murtaugh | 252/174.18 X |
| 4,295,930 | 10/1981 | Aitken et al. | 162/158 |
| 4,369,041 | 1/1983 | Dvorsky et al. | 8/532 |
| 4,470,912 | 9/1984 | Beall | 210/708 |
| 4,726,809 | 2/1988 | DeBoer et al. | 536/45 X |
| 4,731,162 | 3/1988 | Solarek et al. | 536/52 X |
| 4,792,415 | 12/1988 | Colegrove | 252/315.3 X |
| 4,818,292 | 4/1989 | Iley et al. | 252/358 |

OTHER PUBLICATIONS

Hawley's Condensed Chemical Dictionary, 11ed (Van Nostrand Reinhold Co., N.Y., 1987) p. 800.

Primary Examiner—Robert L. Stoll
Assistant Examiner—Daniel S. Metzmaier
Attorney, Agent, or Firm—James P. Barr

[57] ABSTRACT

This invention relates to a novel composition for breaking oil in water emulsions. More specifically, this invention relates to a cationic quaternary ammonium modified blend of a starch and a natural gum, which is effective at breaking oil in water emulsions.

6 Claims, 5 Drawing Sheets

EMULSION BREAKING USING CATIONIC QUATERNARY AMMONIUM STARCH/GUMS

BACKGROUND OF THE INVENTION

1. Field of the Invention

This invention relates to emulsion breaking agents for use on oil/water emulsions and more specifically to a cationic quarternary ammonium modified blend of a starch and a natural gum.

2. Description of the Prior Art

The preparation of cationic starch quarternary ammonium ethers is well known in the art. They may be synthesized by reacting starch and, e.g., a quarternary halohydrin salt with an alkali. The procedure used to synthesize a quarternary starch combination is disclosed in "Starch: Chemistry and Technology," Whistler, R. L. and Paschall, E. F. eds. Chapter 16, Production and uses of Cationic Starches, by Paschall E. F. (1967). U.S. Pat. No. 4,088,600 (Tutein et al) further illustrates the use of cationic starches as demulsifiers for breaking oil/water and water/oil emulsions. Applicable starches disclosed therein include corn, potato, tapioca, sago, rice, wheat, waxy maize, grain sorghum, grain starches in raw or modified forms, e.g. modified with acid, oxidizing agent and the like; to amylose and amylopectin; and to the linear and branched components respectively, of corn starch; and also to dextrin. The quarternary ammonium starches consist of a starch group and a quarternary ammonium group. The degree of substitution of these products is within the range of about 0.01 to 0.75 quarternary units per anhydroglucose unit in the starch group.

SUMMARY OF THE INVENTION

It is an object of this invention to provide an improved composition for breaking oil in water It is another object of this invention to provide a method of treating various industrial waste streams to separate oil from water in compliance with FOG (fats, oils, grease), BOD and COD limitation for waste discharges.

In accordance with this invention, there have been provided certain novel compositions comprising a cationic quarternary ammonium modified blend of a starch and a natural gum, which compositions are effective at breaking oil in water emulsions.

Also provided in accordance with this process is a process for treating industrial waste streams containing oil in water emulsions comprising adding to the waste stream a cationic quarternary ammonium modified blend of a starch and a natural gum in an amount effective to break the oil in water emulsion.

DETAILED DESCRIPTION

Figure 1:
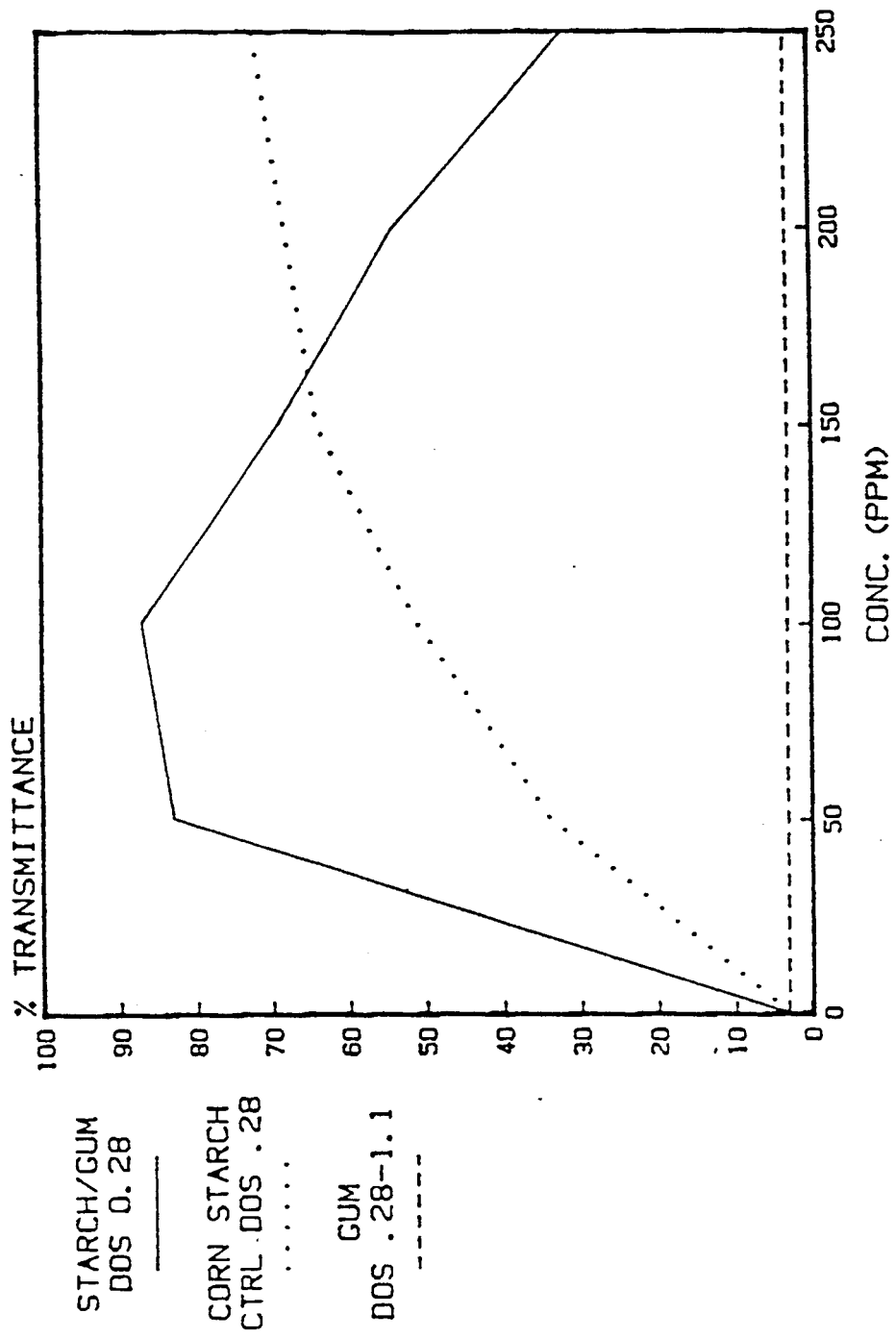
FIGS. 1-5 represent performance comparisons of various cationic starch/cationic gum mixtures with cationic starches or cationic gums alone as measured by percent transmittance of the subnatant of treated oil-in-water emulsion.
Figure 2:
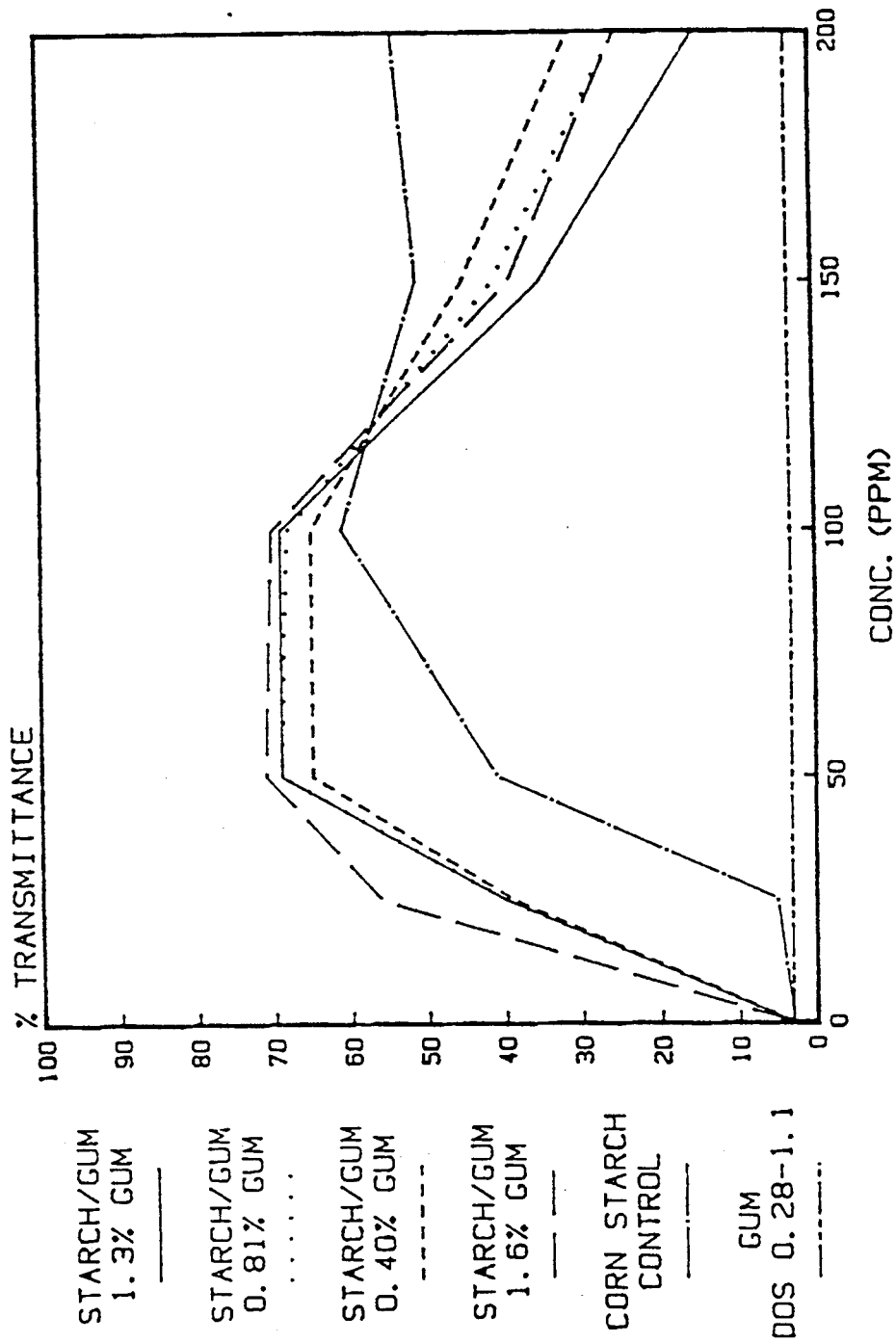
Figure 3:
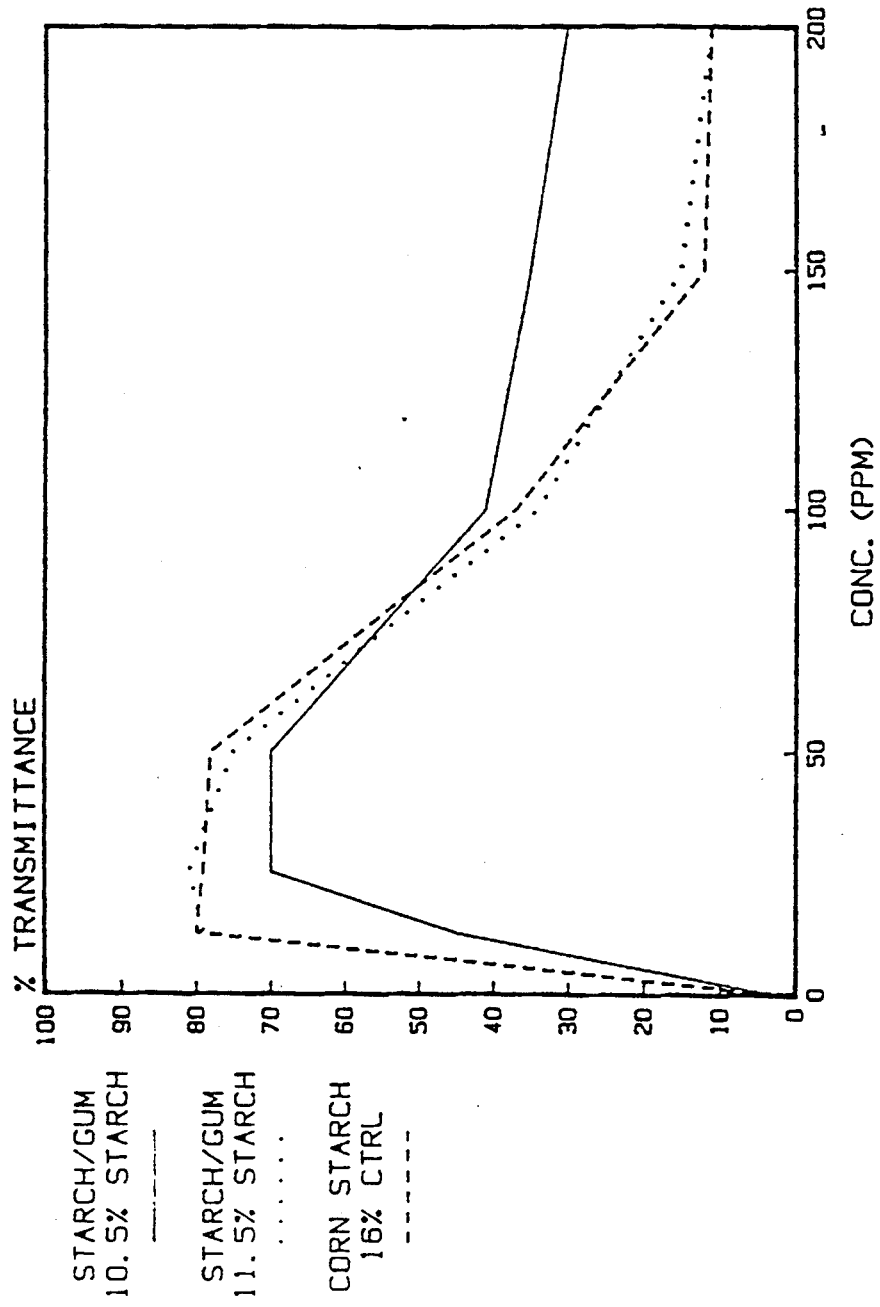
Figure 4:
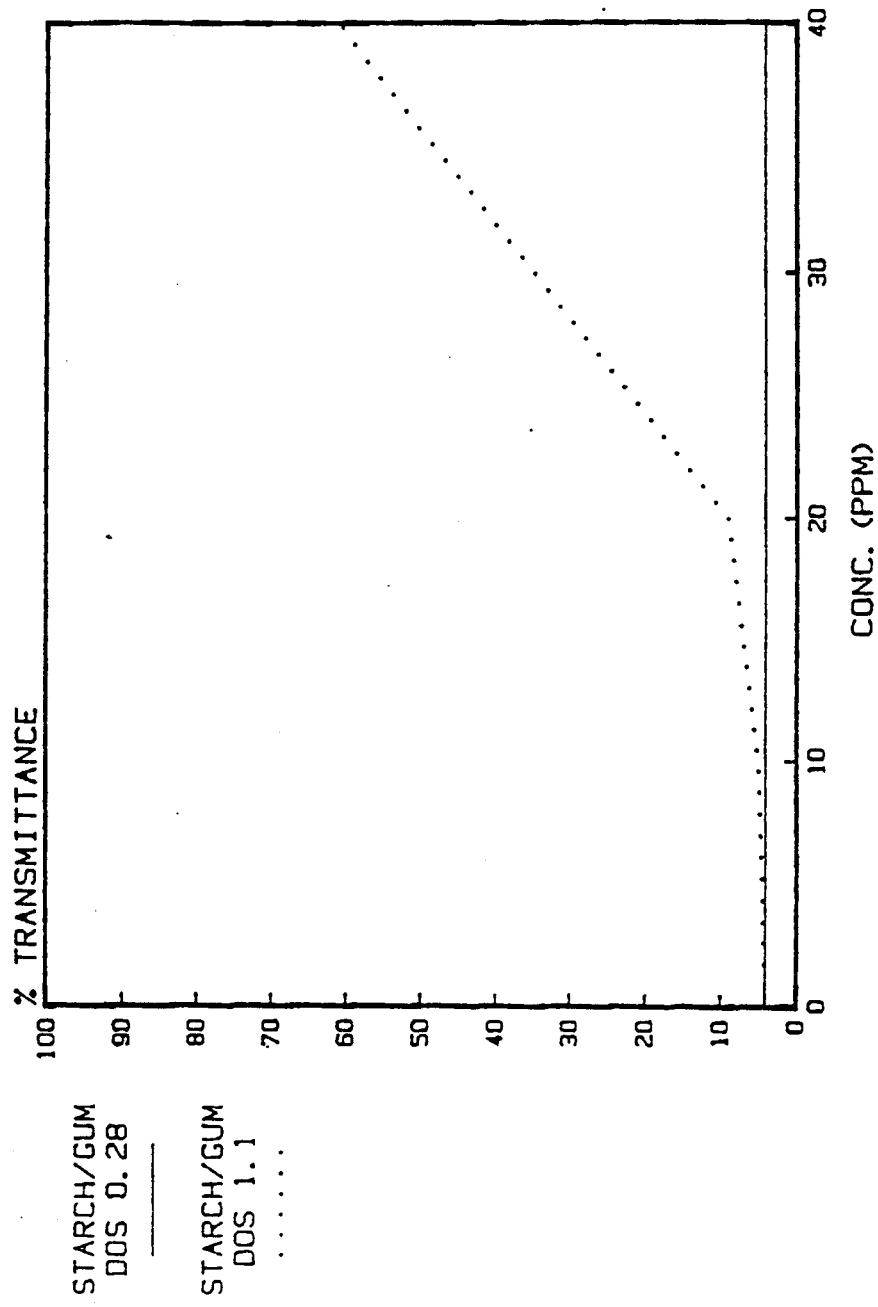
Figure 5:
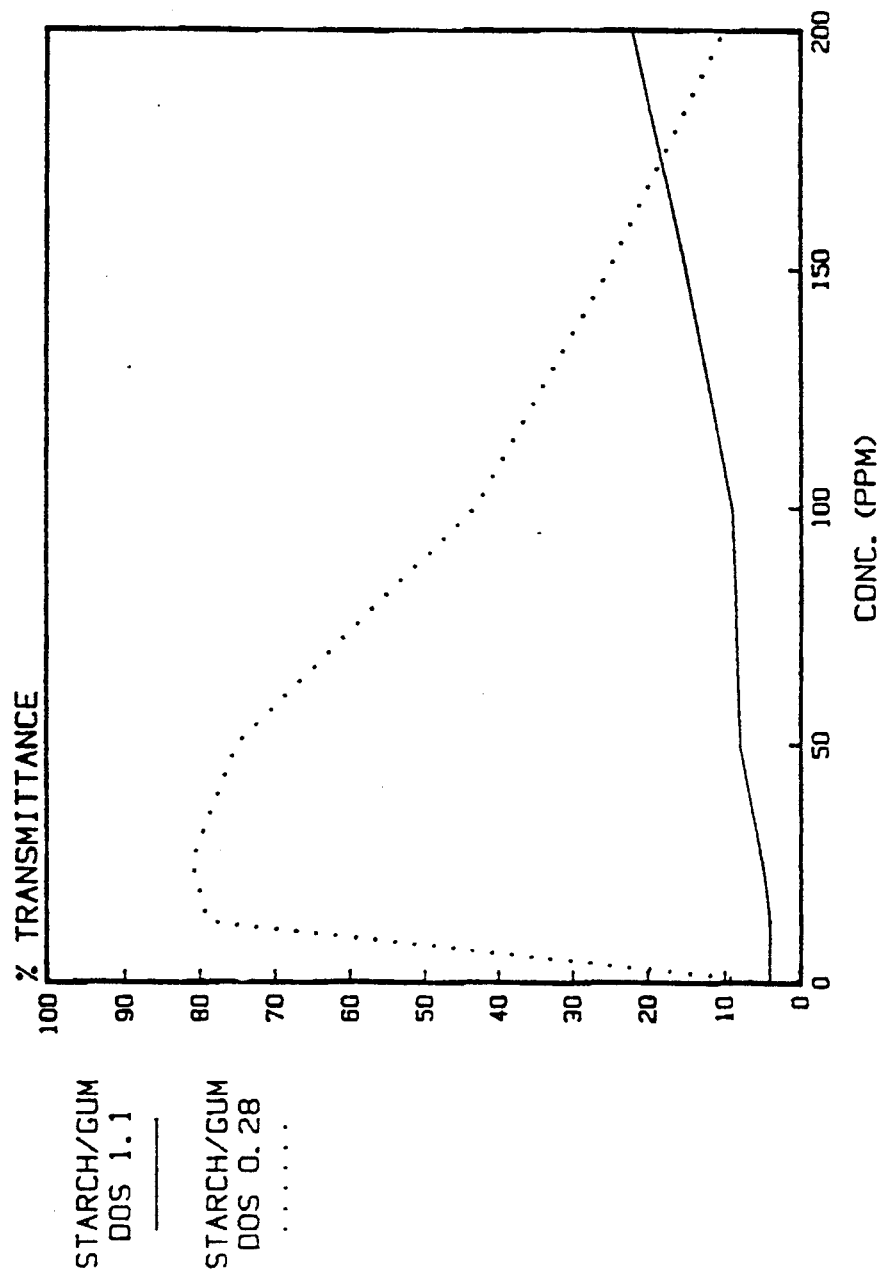

The present invention is directed to compositions useful for breaking oil in water emulsions, said compositions comprising cationic quarternary ammonium modified blends of a starch and a natural gum. The cationically modified blends of the instant invention may be prepared by reacting a mixture of a starch and a natural gum with a quaternary ammonium compound in the presence of an alkali catalyst at a pH in the range 12-13. In general, the cationic quarternary ammonium starch and gum combinations contain between 0.7-3% preferably 1.0-2.1% by weight gum, 7-30% preferably 12-16% by weight starch and a sufficient amount of the quarternary compound to assure a cationic charge in the range of about 0.2-2.0 meq/g, which amount is typically achieved with a wt. % of 2-50% preferably 7-33%.

Suitable natural gums for use in this invention include, but are not limited to, carboxymethyl cellulose, guar, locust bean, karaya, alginate including propylene glycol alginate and sodium alginate and xanthum gum and is preferably guar, carboxymethyl cellulose, or alginate gum.

Suitable starches for use in this invention include, but are not limited to, corn, potato, tapioca, sago, rice, wheat, waxy maize, grain sorghum, grain starches in raw or modified forms, e.g. modified with acid, oxidizing agent and the like; to amylose and amylopectin; and to the linear and branched components respectively, of corn starch; and also to dextrin.

The quarternary ammonium compound can be expressed by the following formula:

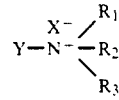

wherein X is any monovalent anion including, for example, chloride, bromide, iodide, methyl sulfate, and the like; Y is selected from the group consisting of 2, 3 epoxy 3-halo-2-hydroxy propyl, 2 haloethyl, o, p or m ($\alpha$ hydroxy-$\beta$ halo ethyl) benzyl; $R_1$, $R_2$ and $R_3$ are independently selected from the group consisting of hydrogen, hydroxyl, alkyl, substituted alkyl, aryl and aralkyl, and in which two of the R's may be joined to form a heterocyclic or a homocyclic ring compound, further in which the total number of carbons in all three of $R_1$, $R_2$ and $R_3$ should not exceed about 14 carbons. If all three of $R_1$, $R_2$ and $R_3$ are different and $R_3$, contains more than 3 carbon atoms but not more than 12, then $R_1$ and $R_2$ should preferably be from the group consisting of methyl and ethyl; and if $R_1$ and $R_2$ are joined to form a ring compound, $R_3$ should preferably not be greater than ethyl.

The synthesis reactions to produce the cationic quarternary ammonium modified starch-gum compositions of the instant invention, generally involve reacting the hydroxyl groups on the starch and gum molecules with the reactive Y group of the quarternary ammonium reactant. Thus, for example in a typical case where the gum is guar gum, the quarternary ammonium compound is N-(3-chloro-2-hydroxypropyl) trimethylammonium chloride and the alkali is sodium hydroxide; the simplified reaction may be expressed as:

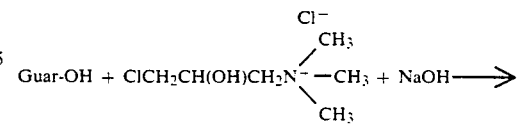

-continued

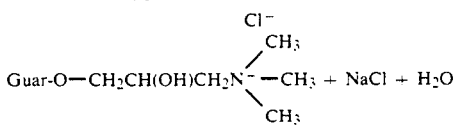

Similarly, the simplified reaction for the cationic starch may be expressed as follows:

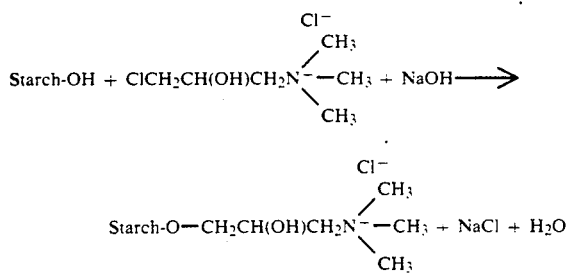

It has been discovered that the most effective emulsion breaking compositions have a degree of substitution in the range 0.1 to 1.8 preferably 0.2 to 1.2, wherein the degree of substitution (DOS) is defined as the number of moles of quarternary ammonium substituent per anhydroglucose unit contributed by the starch and gums. The degree of substitution for the compositions of this invention was calculated theoretically and found to be in the range 0.3 to 1.45.

Generally, the cationic quarternary ammonium starch-gums may be added to waste streams containing emulsified oil at a dosage concentration in the range 10 ppm to 20,000 ppm preferably between 100 ppm to 2000 ppm. The pH of the waste stream should be adjusted if necessary in the range 5-11 preferably 6-10. The pH of the waste stream may be adjusted with any suitable alkaline hydroxide such as sodium hydroxide and the like.

The following examples are provided to illustrate the invention, but are not to be construed as limiting the invention in any way except as indicated in the appended claims. The examples provided herein include various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention.

EXAMPLE 1

The compositions of this invention were evaluated for their ability to break emulsions using four synthetic oil in water emulsions as shown in Table 1.

TABLE 1

| Composition of Synthetic Oil Emulsions | | | |
|---|---|---|---|
| Emulsion No. 1 | | Emulsion No. 2 | |
| Mineral Seal Oil | (42.5%) | Corn Oil | (75%) |
| Oleic Acid | (37.6%) | Sorbitan Mono Laurate | (11.0%) |
| Alkyl Aryl Polyether | (19.9%) | Oleic Acid | (14%) |
| Emulsion No. 3 | | Emulsion No. 4 | |
| 10W-40 Motor Oil | (75%) | Lard | (75%) |
| Petroleum Sulphonate | (25%) | Lauryl Alcohol | (11.8%) |
| | | Oleic Acid | (13.2%) |

These synthetic oil in water emulsions were formulated in the laboratory to serve as a reproducible method to quantitatively evaluate the emulsion breaking ability of the polymer compositions. The emulsions were freshly made for each test. The synthetic emulsions were prepared as follows:

The ingredients were mixed in a Waring blender for 10 minutes and 10 g of the concentrate added to a clean blender and diluted (390) ml) with distilled water. The mixture was blended for seven minutes after which it was diluted 9:1 with tap water. This emulsion was mixed for 15 minutes and then allowed to stand for 16 hours prior to using it.

1% active polymer solutions were mixed and dosed at varying concentrations (4-200 ppm) to the emulsion (100 ml). The treated emulsion was mixed for 5 minutes and allowed to stand without mixing for 30 minutes. A wide tip pipette was used to sample the subnatant which was placed in a colorimetric tube and the percent light transmission (% T) recorded at 490 nm using a Perkin Elmer Colman 295. The effectiveness of the treatments for breaking the emulsions was determined by comparing the % T of the subnatants. The higher the % T translated into a more effective polymer for emulsion breaking.

A number of cationic quaternary ammonium gums were prepared by reacting guar gums with varying amounts of N-(3-chloro-2-hydroxy propyl) trimethyl ammonium chloride, with sodium hydroxide as catalyst. The degree of substitution (DOS) of these products was calculated theoretically and was found to be in the range of 0.3 to 1.45. The actual DOS values were 0.24-1.18. All of these cationic quarternary ammonium gums samples were completely ineffective as emulsion breakers on all four synthetic emulsions.

EXAMPLE 2

A number of cationic quaternary ammonium starch and gum combinations were prepared by adding between 0.7 and 3.0% guar gum to a corn starch slurry (7-16%) and reacting the mixture as described by Whistler. The DOS ranged between 0.24 and 1.18. These combinations As indicated by Graph No. 1, the performance of the starch/gum polymer greatly enhanced the emulsion breaking capability of starch alone upon emulsion No. 3 which was unexpected, not only considering the ineffectiveness of gum by itself, but also considering the substantially improved performance in view of the starch control. Consequently four additional starch/gum polymers were synthesized using corn starch and guar gum at a DOS 0.24 varying the guar concentration between 0.4-1.6%. This maximum guar concentration was chosen so as to ensure the viscosity of the product did not exceed 10,000 cps.

The results are illustrated in Graph No. 2 which indicates that as the concentration of guar gum is increased to it's maximum of 1.6%, the performance of the starch-gum polymers is increased. It should also be noted that all cationic quarternary starch gum samples outperformed the cationic starch control (Sepol 433 manufactured by Dearborn Chemical Co.).

The starch/gum polymer was also optimized from the perspective of DOS by varying the concentration of starch and cationic quarternary ammonium compound, in this case corn starch and N-(3 chloro-2 hydroxy propyl) trimethyl ammonium chloride to determine the requisite concentrations necessary for emulsion breaking. The concentration of corn starch in the control was 16.3%. This starch concentration was reduced in the test samples to 11.5% and 10% together with 1.6% guar gum. The synthesis of the cationic quarternary ammonium starch-gum was completed and was screened along side a corn starch control (16%) upon emulsion No. 2. The results are illustrated in Graph No. 3 which indicates that it is only necessary to have approximately 11.5% of corn starch and 1.6% of guar gum. This ratio of starch/gum performed as well as 16.3:1.6 percent starch/gum and outperformed the cationic starch control (16.3%:-corn starch).

The concentration of quarternary ammonium compound was optimized for various oil in water emulsions by varying the DOS between 0.12 to 1.2. As illustrated by Graph Numbers 4 and 5, emulsion No. 1 was broken more effectively with a high DOS starch/gum (1.1) whereas emulsion No. 2 was broken with a lower DOS starch/gum (0.24). Consequently a cationic quarternary ammonium compound concentration (in this case N-(3 chloro-2 hydroxy propyl) trimethyl ammonium chloride) was determined such that two starch/gum polymers of DOS values 0.24 and 1.1 were synthesized and screened upon field samples alongside starch control samples of equivalent DOS values.

Three emulsions were screened in a waste stream containing waste oil reclamation and recycling as shown in Table No. 2, emulsions 1, 2 and 3. It is apparent that these emulsions are broken only by polymers having a particular DOS. However, more important is the fact that starch/gum polymers having equivalent DOS outperformed the respective starch controls by at least 60%. In emulsion 4, which contained a lubricating oil in water emulsion, a starch of 0.28 DOS had no effect upon the emulsion. A higher charged starch (DOS 1.1) broke the emulsion at 1000 ppm. However, a starch/gum at a DOS of 0.24 broke the emulsion more effectively than either starches at only 500 ppm. Obviously the DOS is not as important upon this emulsion as some other factor such as perhaps molecular weight which is afforded by the natural gum.

TABLE 2

Field Test Screening of Starch/Gum Polymers

| Emulsion Number | Most Effective Starch | D.O.S. | Concentration to Break (ppm) Emulsion (ppm) | Most Effective Starch/Gum | D.O.S. | Concentration to Break Emulsion (ppm) |
|---|---|---|---|---|---|---|
| 1 | Corn Starch | 0.28 | 15,000 | Corn Starch/Guar | 0.24 | 5,000 |
| 2 | Corn Starch | 0.28 | 10,000 | Corn Starch/Guar | 0.24 | 3,000 |
| 3 | Corn Starch | 1.1 | 6,000 | Corn Starch/Guar | 1.18 | 2,000 |
| 4 | Corn Starch | 1.1 | 1,000 | Corn Starch/Guar | 0.24 | 500 |
| 4 | Corn Starch | 0.28 | Did Not Break Emulsion | | | |

EXAMPLE 3

Alternative gums as indicated below were evaluated, using the starch:gum ratios and DOS values previously mentioned.

A. Carrageenan
B. Locust Bean Gum
C. Carboxy Methyl Cellulose
D. Karaya
E. Sodium Alginate
F. Propylene Glycol Alginate.

The screening results are shown in Table Nos. 4, 5, and 6, which indicate that on emulsion numbers 2 and 4 (Table 5, 6) starch/propylene glycol alginate gum with a DOS of 0.7 was superior to the starch at all concentrations.

As indicated by Table No. 3 prior art had shown natural gums to be effective emulsifiers and with respect to guar gum, a flocculant of inorganic minerals. Consequently it was unexpected that some of them would function in the opposite sense as emulsion breakers.

TABLE 3

Chemistry of Natural Gums Utilized in the Synthesis with Corn Starch and a Quaternary Amine

| Gum | Chemical Structure | | Typical Industrial Applications |
|---|---|---|---|
| Guar | $\beta$-D-Mannopyranosyl Linear Chain | Alternating | Flocculant in mining |
| | a-D-Galactoyranosyl Side Branch | Co-Polymer | Thickener in food industry wet strength additive in paper |
| Locust Bean | Carbohydrate containing | | Thickener in food industry |
| | $\beta$-D-Mannopyranosyl Linear Chain | Block | Wet strength additive in paper |
| | a-D Galactopyranosyl Side Chain | Copolymer | |
| Carboxy Methyl Cellulose | $\beta$-Anhydroglucose Sodium Methyl Acetate Derivative | | Dispersants in detergent Surface sizing in paper Thickener in food industry |
| Karaya | Galacturonic Acid and Rhamnose | | Stabilizer & emulsifier in food industry |
| Sodium Alginate Propylene Glycol Alginate | Polymannuronic and Polyguluronic Acids | | Emulsifiers/stabilizers and thickeners in the food industry |
| Xanthum Gum | $\beta$-D-Glucose/$\beta$-d-Mannose and $\beta$-D-Glucoronic Acid | | Viscosifier in oil industry Thickener in food industry |
| Gum Arabic | | | |

TABLE 4

Emulsion Breaking Efficacy upon Synthetic Emulsion No. 1

| | | Percent Transmittances at Various Dosage Rates (ppm) | | | | |
|---|---|---|---|---|---|---|
| Polymer | D.O.S. | 12.5 | 25 | 50 | 75 | 100 |
| Carboxymethyl Cellulose | 0.28 | 7 | 9 | 85 | 78 | 91 |

TABLE 4-continued

Emulsion Breaking Efficacy upon Synthetic Emulsion No. 1

| Polymer | D.O.S. | Percent Transmittances at Various Dosage Rates (ppm) | | | | |
|---|---|---|---|---|---|---|
| | | 12.5 | 25 | 50 | 75 | 100 |
| Propylene Glycol Alginate | 0.28 | 7 | 32 | 74 | 71 | 82 |
| Xanthum Gum | 0.28 | 7 | 19 | 73 | 74 | 79 |
| Sodium Alginate | 0.28 | 7 | 29 | 81 | 77 | 84 |
| Sodium Alginate | 0.7 | 68 | 80 | 91 | 86 | 89 |
| Propylene Glycol Alginate | 0.7 | 69 | 80 | 90 | 89 | 91 |
| Starch (Control) | 0.28 | 75 | 82 | 84 | 84 | 86 |

TABLE 5

Emulsion Breaking Efficacy upon Synthetic Emulsion No. 2

| Polymer | D.O.S. | Percent Transmittances at Various Dosage Rates (ppm) | | | |
|---|---|---|---|---|---|
| | | 50 | 100 | 150 | 200 |
| Carboxymethyl Cellulose | 0.28 | 24 | 19 | 25 | 37 |
| Propylene Glycol Alginate | 0.28 | 24 | 21 | 25 | 40 |
| Xanthum Gum | 0.28 | 23 | 26 | 27 | 34 |
| Sodium Alginate | 0.28 | 24 | 22 | 27 | 35 |
| Sodium Alginate | 0.7 | 35 | 29 | 39 | 58 |
| Propylene Glycol Alginate | 0.7 | 41 | 36 | 44 | 53 |
| Starch (Control) | 0.7 | 31 | 30 | 33 | 48 |

TABLE 6

Emulsion Breaking Efficacy upon Synthetic Emulsion No. 4

| Polymer | D.O.S. | Percent Transmittances at Various Dosage Rates (ppm) | | | |
|---|---|---|---|---|---|
| | | 12.5 | 25 | 50 | 75 |
| Carboxymethyl Cellulose | 0.28 | 49 | 55 | 61 | 85 |
| Propylene Glycol Alginate | 0.28 | 67 | 80 | 83 | 92 |
| Xanthum Gum | 0.28 | 65 | 75 | 80 | 91 |
| Sodium Alginate | 0.28 | 70 | 76 | 80 | 85 |
| Sodium Alginate | 0.7 | 80 | 90 | 94 | 99 |
| Propylene Glycol | 0.7 | 78 | 94 | 95 | 97 |
| Starch (Control) | 0.7 | 44 | 91 | 92 | 94 |

We claim:

1. A composition comprising a cationic quaternary ammonium modified starch having the formula

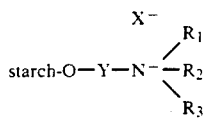

and a cationic quaternary ammonium modified gum having the formula

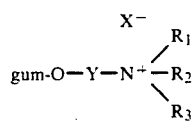

wherein X is any monovalent anion including, chloride, bromide, iodide, methyl sulfate; Y is selected from the gruop consisting of 2, 3 epoxy propyl, 3-halo-2-hydroxy propyl, 2 haloethyl, (α hydroxy-β halo ethyl) benzyl; $R_1$, $R_2$ and $R_3$ are alkyl, and in which two of the R's may be joined to form a heterocyclic ring compound, further in which the total number of carbons in all three of $R_1$, $R_2$ and $R_3$ should not exceed about 14 carbons, with the proviso that if all three of $R_1$, $R_2$ and $R_3$ are different and $R_3$ contains more than 3 carbon atoms but not more than 12, then $R_1$ and $R_2$ are from the group consisting of methyl and ethyl; and if $R_1$ and $R_2$ are joined to form a ring compound, $R_3$ is an alkyl group not greater than ethyl and wherein the concentration of gum in the composition is in the range of 0.7 to 3 percent by weight and the concentration of starch in the composition is in the range of 7 to 30 percent by weight and wherein the composition has a degree of substitution in the range 0.1 to 1.8.

2. A composition according to claim 1 wherein the gum is selected from the group consisting of guar, carboxymethyl cellulose, propylene glycol alginate, locust bean, karaya, sodium alginate and xanthum.

3. A composition according to claim 1 wherein the starch is selected from the group consisting of corn, potato, tapioca, sago, rice, wheat, waxy maize, grain sorghum, grain starches and dextrin.

4. A composition according to claim 1 wherein the degree of substitution of the composition is in the range 0.2 to 1.2.

5. A composition comprising a cationic quaternary ammonium modified blend of a starch and a natural gum prepared by reacting a mixture of a starch and a natural gum with a quaternary ammonium compound in the presence of an alkali catalyst at a pH in the range of 12 to 13 wherein the resultant composition contains from 0.7 to 3% by weight gum and from 7 to 30% by weight starch and wherein the composition has a degree of substitution in the range 0.1 to 1.8.

6. A composition comprising a cationic quaternary ammonium modified starch having the formula

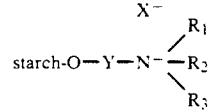

and a cationic quaternary ammonium modified gum having the formula

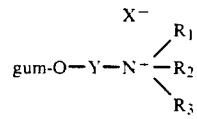

wherein X is any monovalent anion including, chloride, bromide, iodide, methyl sulfate; Y is selected from the gruop consisting of 2, 3 epoxy propyl, 3-halo-2-hydroxy propyl, 2 haloethyl, (α hydroxy-β halo ethyl) benzyl; $R_1$, $R_2$ and $R_3$ are alkyl, and in which two of the R's may be joined to form a heterocyclic ring compound, further in which the total number of carbons in all three of $R_1$, $R_2$ and $R_3$ should not exceed about 14 carbons, with the proviso that if all three of $R_1$, $R_2$ and $R_3$ are different and $R_3$ contains more than 3 carbon atoms but not more than 12, then $R_1$ and $R_2$ are from the group consisting of methyl and ethyl; and if $R_1$ and $R_2$ are joined to form a ring compound, $R_3$ is an alkyl group not greater than ethyl and wherein the concentration of gum in the composition is in the range of 0.7 to 3 percent by weight and the concentration of starch in the composition is in the range of 12 to 16 percent by weight and wherein the composition has a degree of substitution in the range 0.1 to 1.8.

* * * * *